United States Patent [19]
Lee

[11] 3,922,095
[45] Nov. 25, 1975

[54] WAVELENGTH CALIBRATOR FOR CLINICAL INSTRUMENTS

[76] Inventor: Jin G. Lee, 718 34th St., San Francisco, Calif. 94121

[22] Filed: June 1, 1973

[21] Appl. No.: 366,225

[52] U.S. Cl. ................. 356/225; 356/74; 356/256
[51] Int. Cl.² ........................................... G01J 1/42
[58] Field of Search........ 356/74, 96, 97, 100–101, 356/225–228, 256; 250/239

[56] References Cited
UNITED STATES PATENTS
3,780,631  12/1973  Schulman .......................... 356/225

OTHER PUBLICATIONS
Williamson, J. O. S. A., Vol. 39, No. 7, July, 1949, pp. 613 and 614.
Zwerdling et al., Spectrochimica Acta, Vol. 17, October, 1961, pp. 819–856.

Primary Examiner—Vincent P. McGraw
Assistant Examiner—F. L. Evans
Attorney, Agent, or Firm—Townsend & Townsend

[57] ABSTRACT

A device for calibrating a spectrophotometer or like device is disclosed. Spectrophotometers generally have an adjustable monochromator adapted to transmit a substantially monochromatic light beam through a sample cell. A detector measures the amount of light transmitted through the sample cell at different wavelengths to determine the composition of the sample. The present device comprises a probe adapted to be interposed in the light beam intermediate the monochromator and the detector in place of the sample cell. The probe has a narrow band-pass light filter having a known center wavelength which is exposed to the light beam, and photoconductive element located within the probe behind the filter so that light passing through the filter impinges on the photoconductive element. The photoconductive element has an electrical conductance proportionate to the radiant intensity of the light impinging on the element. Means are provided for measuring the conductance of the photoconductive element, and the monochromator is adjusted to achieve maximum transmittance through the filter. When maximum transmittance is achieved, the spectrophotometer has been calibrated at the center wavelength of the filter.

16 Claims, 3 Drawing Figures

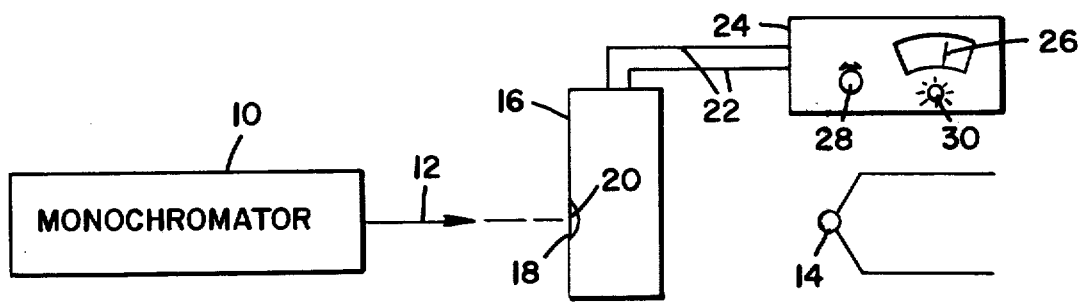
FIG_1
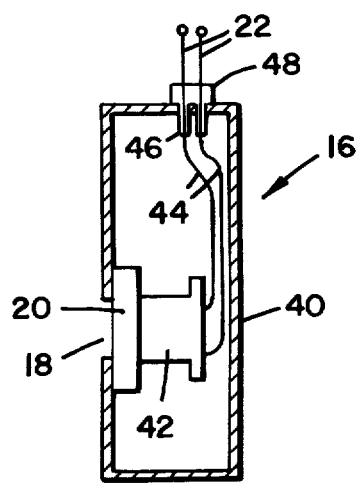
FIG_2
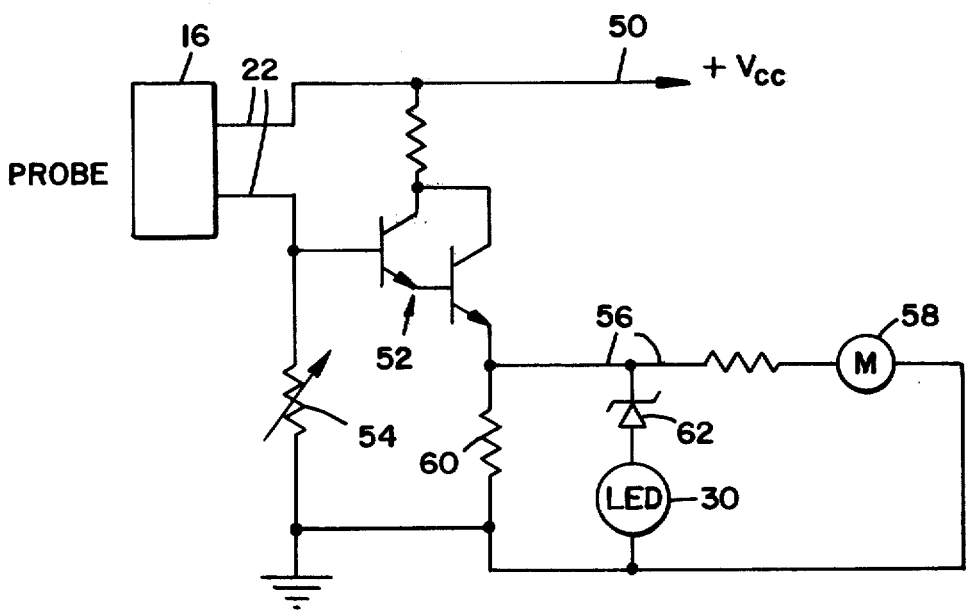
FIG_3

3,922,095

WAVELENGTH CALIBRATOR FOR CLINICAL INSTRUMENTS

BACKGROUND OF THE INVENTION

The present invention relates to means for calibrating a spectrophotometer or like device having an adjustable monochromator.

A spectrophotometer is basically a device which measures the transmittance of light of varying wavelengths through a sample to determine the composition of that sample. A spectrophotometer includes a monochromator which emits a monochromatic light beam. The monochromator is adjustable so that light beams of various wavelengths can be emitted. A sample cell is interposed in the light beam between the monochromator and a detector. The detector measures the radiant intensity of the light passing through the sample cell, and by passing light of various wavelengths through the sample cell, the composition of the matter in the cell can be determined. Spectrophotometers have many clinical and laboratory applications, and are used to perform a wide variety of tests.

The monochromator portion of the spectrophotometer ordinarily employs a prism or grating, and is an extremely delicate mechanism. However, the monochromator must be adjustable over a broad wavelength spectrum. Minor inaccuracies in the adjustment mechanism can cause substantial errors in the output of the spectrophotometer. Also, the monochromator can be quite sensitive to atmospheric conditions. Slight errors in the mechanism can cause substantial inaccuracies in test results. Hence, if a spectrophotometer is to be used in clinical applications, it is essential that the monochromator portion be calibrated frequently, preferably at least once each day.

In order to accurately calibrate various types of spectrophotometers, different automatic mechanisms built into the spectrophotometer itself have been developed. Examples of such devices are contained in U.S Pat. No. 3,504,977 and U.S. Pat. No. 3,680,957. However, these devices are extremely complex, greatly complicating the basic spectrophotometer itself, which is generally a rather simple device. Since the calibration mechanism is integral to the spectrophotometer, it is only useful in that particular device and cannot be used for calibrating other spectrophotometers. These mechanisms are currently available for calibrating spectophotometers, but have very limited practical utility.

SUMMARY OF THE INVENTION

The present invention relates to apparatus for calibrating a spectrophotometer or like device which has an adjustable monochromator. A narrow band light filter having a known wavelength is adapted to be interposed in the output beam of the monochromator. A photoelectric element is adapted to be interposed in the output beam of the monochromator downstream of the filter so that light from the monochromator passing through the filter impinges on the photoelectric element. Means are provided for measuring the electrical resistance of the photoelectric element so that the monochromator can be adjusted to obtain maximum transmittance through the filter, thereby calibrating the monochromator at the center wavelength of the filter.

In the present invention, the light filter and the photoelectric element are encased in a portable probe. The probe is connected by lead lines to the means for measuring the electrical resistance of the element. The probe has an aperture exposing the light filter so that the filter can be interposed in the output beam of the monochromator. The photoelectric element is located within the probe behind the filter so that only light passing through the filter impinges on the element.

In the present invention, the calibration procedure involves adjusting the monochromator until a peak reading is obtained on the resistance measuring means. It is not necessary to obtain the absolute valve of the reading, but only the relative magnitude so that the wavelength of the monochromator can be matched to the center wavelength of the filter. This greatly simplifies the measuring circuit required, since accuracy in the measurements themselves is not essential. However, since only peak resistance is of interest the circuit can be made readily adaptable to a wide variety of applications, and used to calibrate different types of spectrophotometers at different wavelengths. This adaptability is achieved by a simple manually controlled variable resistance, and the actual value of the resistance used is irrelevant.

An advantage of the calibration procedure of the present invention is that the effect of defects in detector response on the accuracy of the calibration procedure is minimal. A narrow band-pass light filter is used so that a general lack of broadband detector response has little effect in the specific wavelength band of interest. Since obtaining flat broadband detector response is difficult, the lack of the necessity of such response permits the utilization of less expensive and less sensitive photoelectric elements. However, if the response bandwidth of the photoelectric element is matched to the center wavelength of the light filter, as preferred in the present invention, the accuracy of the calibration can actually be enhanced, even though less expensive components are used.

Since the probe is portable, it can readily be inserted intermediate the monochromator and the detector of the spectrophotometer in the place of the sample cell. The monochromator can then be adjusted until peak conductivity is obtained through the photoelectric element. This can be accomplished quite easily by laboratory technicians having limited skills, and a variety of different types of spectrophotometers can be calibrated in a matter of a few minutes.

An advantage of the probe of the present invention is that the probe is separable from a resistance measuring apparatus. Hence, a wide variety of probes responsive to light beams of various wavelengths can be employed so that the spectrophotometer can be calibrated at a variety of wavelengths, greatly increasing the accuracy of the spectrophotometer. However, the probes simply plug into the measuring means so that a single measuring means can be used to calibrate the spectrophotometer over a wide wavelength band. Also, different probes can be used to calibrate infrared, visual or ultraviolet spectrophotometers with the same measuring circuitry.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and descrip-

BRIEF DESCRIPTION OF THE DRAWINGS

FIG. 1 is a schematic view of the present invention utilized with a standard monochromator;

FIG. 2 is a side cross-sectional elevation view of the probe of the present invention;

FIG. 3 is a schematic view of the measuring circuit of the present invention.

DESCRIPTION OF THE PREFERRED EMBODIMENT

The use of the present invention with a standard spectrophotometer is illustrated by way of reference to the schematic view of FIG. 1. The spectrophotometer comprises a monochromator 10 which emits a monochromatic light beam as illustrated by arrow 12. Monochromator 10 is adjustable to emit light beams over a broad spectrum of wavelengths, and includes a prism, grating or like apparatus for obtaining a beam of monochromatic light. The invention applies to infrared, visual or any other light wavelength band. Light beam 12 is directed at a detector 14, which has an electrical conductance proportional to the radiant intensity of the light impinging thereon. Ordinarily, a sample cell or flow cell is interposed in the light beam 12 so that detector 14 measures the amount of light transmitted through the material in the sample cell. By determining the transmittance of the sample over a broad spectrum of light frequencies, the composition of the sample can be determined.

The present invention comprises a probe 16 which is interposed in light beam 12 in the place of the sample cell. Probe 16 has an aperture 18 in the side thereof exposing a narrow band-pass light filter 20 which is interposed in light beam 12. Leads 22 connect probe 16 with a portable console 24. Console 24 contains the electric circuit which measures the light transmitted through light filter 20, which will hereinafter be more fully illustrated. Console 24 has an indicator 26 which indicates the relative magnitude of the light transmitted through light filter 20 as will be explained hereinafter. Knob 28 for manual control of the variable resistance and light emitting diode 30 are also located on the face of console 24, with the other elements of the measuring circuit behind the console face.

Probe 16 is more fully illustrated by way of reference to the cross-sectional view of FIG. 2. Probe 16 has a plastic casing 40 fully enclosing the interior of the probe except for aperture 18. Narrow band light filter 20, located inside plastic casing 40, is exposed by aperture 18. A photoelectric element 42, having electrical conductance proportional to the radiant intensity of the light impinging thereon, is located within casing 40 behind light filter 20. Photoelectric element 42 can be a photodiode or any similar device having electrical conductance directly or inversely proportional to the radiant intensity of the light impinging thereon. (Direct proportionality is assumed for purposes of illustration hereinafter, but an inversely proportional element could be used with obvious modifications.) Leads 44 are connected across photoelectric element 42 and are connected to socket 46. Plug 48 is removably inserted in socket 46, providing an electrical connection between exterior leads 22 and interior leads 44.

The measuring circuit of the present invention, which measures the conductance of photoelectric element 42 in probe 16, is illustrated by way of reference to the schematic view of FIG. 3. The measuring circuit is generally included in a console, such as console 24 of FIG. 1. Probe 16 is connected to the measuring circuit by means of lead lines 22. Voltage is supplied to the measuring circuit by means of a dry cell battery or other voltage source at 50. The photoelectric element (42 in FIG. 2) of probe 16 is connected in series with voltage source 50 by means of lead lines 22. The current passing through the photosensitive element of probe 16 is fed to two stage amplifier 52. Lead line 22 connecting probe 16 with amplifier 52 is tapped by grounded rheostat 54 to provide a manual control over the current level passed to the amplifier. The amplified current generally passes through meter 56 (which can be ammeter or other current measuring device) which operates indicator 26 illustrated in FIG. 1. In order to prevent overloading of meter 58, line 56 is tapped by grounded resistor 60 and grounded Zener diode 62. A light-emitting diode 30 is connected between Zener diode 62 and ground to indicate passage of current through the Zener diode and hence a potential overload on meter 58.

In operation, the present invention is utilized as follows. First, a probe 16 having an optical filter 20 with the desired center wavelength is connected to the measuring circuit of console 24 by inserting plug 48 in socket 46 in the probe. When the probe is connected to the measuring circuit, an initial surge of current will pass through the measuring circuit, some of which passes through Zener diode 62. This surge of current will illuminate light emitting diode 30, indicating that the battery or other voltage source is operating. The probe 16 is then inserted in the spectrophotometer to be calibrated between monochromator 10 and detector 14, taking the place of the sample cell. The probe is aligned to that aperture 18 exposes light filter 20 to the monochromatic light beam 12.

When probe 16 has been properly positioned in the path of the light beam 12, monochromator 10 is first adjusted so that the wavelength indicator in the monochromator matches the center wavelength of the light filter 20. At this time, the actual wavelength of monochromatic light beam 12 should approximate the center wavelength of light filter 20. Knob 28 on console 24, which controls variable resistance 54, is turned in either direction so that indicator 26, controlled by meter 58, is approximate the center of the meter scale. At this time, light emitting diode 30 should not be lit. If diode 30 is lit, knob 28 should be adjusted upward until the light goes out. When the light emitting diode is not lit, and indicator 26 is approximate the center of the scale, the device is ready for use to calibrate the monochromator.

The wavelength control on monochromator 10 is then adjusted. The operator first moves the adjustment mechanism of the monochromator in one direction, watching indicator 26 as the monochromator is adjusted. If the reading on indicator 26 decreases, the operator moves the wavelength control in the opposite direction so that the reading on the indicator 26 increases. The wavelength control is moved until the reading on meter 26 peaks, indicating that the monochromatic light beam 12 is matched to the center wavelength of light filter 20. At this time, the monochromator is reset so that the wavelength indicator thereon matches with the center wavelength of the light filter 20. The identical procedure can then be repeated with different probes having light filters of various wavelengths to fully calibrate the monochromator.

In order to achieve the optimum response of the photoelectric element 42, this element is preferably chosen to match as closely as possible the center wavelength of light filter 20. Most photoelectric elements are designed to have relatively flat response over a broad spectrum of wavelengths. However, in the present application, such broadband response is not necessary and can even be detrimental. Of the commercial photoelectric elements available, that element with narrow response which corresponds most closely with the center wavelength of the light filter should be chosen. For different probes having light filters of various center wavelengths, different photoelectric elements should be used to enhance the response of the elements at the center wavelength of the light filter and to permit more accurate calibration of the monochromator. Since absolute value readings are not required by the calibration procedure, merely relative value readings, an exact match of the photoelectric element to the light filter is not essential.

While a preferred embodiment of the present invention has been disclosed in detail, it is apparent that modifications and adaptations of that invention will occur to those skilled in the art. However, it is to be expressly understood that such modifications and adaptations are within the spirit and scope of the present invention as set forth in the following claims.

I claim:

1. Apparatus for calibrating a spectrophotometer or like instrument having an adjustable monochromator adapted to transmit a substantially monochromatic light beam, said apparatus comprising:
    a narrow-band light filter having a known center wavelength, said filter adapted to be interposed in the light beam;
    a photoelectric element adapted to be interposed in the light beam downstream of the light filter so that light passing through said filter impinges on said photoelectric element, said element having an electrical conductance proportional to the radiant intensity of said light impinging on said element;
    means for measuring the electrical conductance of the photoelectric element,
    whereby the monochromator or like device can be adjusted to obtain maximum transmittance through the light filter to calibrate the monochromator at the center wavelength of the filter.

2. Apparatus as in claim 1 wherein the resistance of the photoelectric element is responsive to the wavelength of the light impinging thereon, and wherein the peak response of said photoelectric element is generally matched to the center wavelength of the light filter.

3. Apparatus as in claim 1 and additionally comprising a portable probe containing said light filter and said photoelectric element, said probe having an aperture exposing the light filter so that the filter can be interposed in the output beam of the monochromator with the photoelectric element downstream of the light filter, and wherein the means for measuring the electrical conductance of the photoelectric element is connected to said portable probe.

4. Apparatus as in claim 1 wherein the means for measuring the electrical conductance of the photoelectric element comprises means for passing a current through the photoelectric element and means for measuring the passage of current through the photoelectric element.

5. Apparatus for calibrating a spectrophotometer or like instrument having an adjustable monochromator adapted to transmit a substantially monochromatic light beam to a detector, said apparatus comprising:
    a probe adapted to be inserted in the light beam intermediate the monochromator and the detector, said probe having a narrow band light filter with a known center wavelength adapted to be exposed to the light beam, and a photoelectric element located within the probe behind the filter so that light passing through said filter impinges on said photoelectric element, said element having an electrical conductance proportional to the radiant intensity of the light impinging on said element; and
    means connected to the probe for measuring the conductance of the photoelectric element,
    whereby said variable monochromator can be adjusted to achieve maximum transmittance through the filter to calibrate the spectrophotometer at the center wavelength of the filter.

6. Apparatus as in claim 5 wherein the conductance of the photoelectric element is responsive to the wavelength of the light impinging thereon, and wherein the peak wavelength of the photoelectric element is generally matched to the center wavelength of the light filter.

7. Apparatus as in claim 5 wherein the probe has a casing adapted to enclose the light filter and the photoelectric element, said casing having an aperture adapted to expose the light filter, and wherein the means for measuring the conductance of the photoelectric element are connected to the probe by means of lead lines emanating from said measuring means and attached to said probe.

8. Apparatus as in claim 5 and additionally comprising a plurality of probes, each of said probes having a light filter with a different center wavelength, and wherein said measuring means is releasably connectable to each said probe, whereby the spectrophotometer can be calibrated at a plurality of wavelengths using a single measuring means.

9. Apparatus as in claim 5 wherein the means for measuring the conductance of the photoelectric element comprises means for applying a voltage across the photoelectric element to pass an electric current through said element, and means for measuring the current through the photoelectric element.

10. Apparatus as in claim 9 wherein the means for measuring the current through the photoelectric element comprises a meter, and means for amplifying the current passing through the photoelectric element prior to passage of said current through said meter.

11. Apparatus as in claim 10 and additionally comprising variable resistance means intermediate the photoelectric element and the amplifier, said variable resistance means manually operable to provide selective control over the current to the meter.

12. Apparatus as in claim 10 and additionally comprising voltage regulating means intermediate the amplifier and the meter to prevent damage to said meter.

13. Apparatus as in claim 12 wherein the voltage regulating means comprises a grounded Zener diode, and additionally comprising a light emitting diode intermediate the Zener diode and ground, said light emitting diode being illuminated by passage of current through said Zener diode to ground, said illumination indicating potential overloading of said meter.

14. Apparatus for calibrating a spectrophotometer or like instrument having an adjustable monochromator adapted to transmit a substantially monochromatic light beam, said apparatus comprising:

- a probe adapted to be inserted in the light beam, said probe having an exposed filter adapted to allow passage of light of a known wavelength band into the interior of the probe, and photoelectric means interior to the probe and having an electrical conductance responsive to the radiant intensity of the light transmitted into said probe through the filter;
- means for applying voltage across the photoelectric means to pass a current through said photoelectric means responsive to the conductance of said element;
- means for amplifying the current passed through the photoelectric means;
- manually operable variable resistance means for tapping a selectable proportion of current intermediate the photoelectric means and the amplifying means to control the current to said amplifying means;
- a meter adapted to measure the amplified current; and
- means for tapping the amplified current prior to passage of said current through the meter to prevent overloading of said meter.

15. Apparatus as recited in claim 14 wherein the means for tapping the amplified current comprises a grounded Zener diode, and a light emitting diode intermediate the Zener diode and ground, said light emitting diode being illuminated by passage of current through said Zener diode to ground, said illumination thereby indicating potential overloading of said meter.

16. A method for calibrating a spectrophotometer or like instrument having an adjustable monochromator adapted to transmit a substantially monochromatic light beam to a detector, said method comprising the steps of:

- inserting a probe in the light beam intermediate the monochromator and the detector so that a narrow-band light filter with a known center wavelength forming part of the probe is exposed to the light beam, a photoelectric element being located within the probe behind the filter so that light passing through the filter impinges on the photoelectric element which has an electrical conductance proportional to the radiant intensity of the light impinging on said element;
- measuring the conductance of the photoelectric element with means connected to the probe;
- visually indicating the conductance of the photoelectric element to indicate the intensity of light passing through the light filter; and
- adjusting the monochromator until the intensity of light passing through the light filter is a maximum to calibrate the spectrophotometer at the center wavelength of the filter.

* * * * *